US012745336B2

(12) United States Patent
Lakhera et al.

(10) Patent No.: US 12,745,336 B2
(45) Date of Patent: Sep. 22, 2026

(54) LIGHTING CONTROLLER WITH NOISE AND SIGNAL ISOLATION

(71) Applicant: UnitX, Inc., Santa Clara, CA (US)

(72) Inventors: Ketan Lakhera, San Jose, CA (US); Gilbert Dale Ross, San Mateo, CA (US); Yen-Chia Chu, San Jose, CA (US); Jaideep Singh Chavan, Mountain View, CA (US)

(73) Assignee: UnitX, Inc., Santa Clara, CA (US)

( * ) Notice: Subject to any disclaimer, the term of this patent is extended or adjusted under 35 U.S.C. 154(b) by 0 days.

(21) Appl. No.: 18/824,699

(22) Filed: Sep. 4, 2024

(65) Prior Publication Data

US 2026/0068013 A1 Mar. 5, 2026

(51) Int. Cl.

| | |
|---|---|
| ***H05B 47/16*** | (2020.01) |
| ***H04N 23/66*** | (2023.01) |
| ***H04N 23/74*** | (2023.01) |
| ***H05B 45/31*** | (2020.01) |
| ***H05B 45/325*** | (2020.01) |

(52) U.S. Cl.

CPC ............. *H05B 47/16* (2020.01); *H04N 23/66* (2023.01); *H04N 23/74* (2023.01); *H05B 45/31* (2020.01); *H05B 45/325* (2020.01)

(58) Field of Classification Search

CPC ...... H05B 47/16; H05B 45/31; H05B 45/325; H04N 23/66; H04N 23/74

See application file for complete search history.

(56) References Cited

U.S. PATENT DOCUMENTS 6,009,131 A * 12/1999 Hiramatsu .............. H04L 7/042 375/357
2011/0279057 A1* 11/2011 Briggs ................. H05B 47/196 315/294
2017/0202062 A1* 7/2017 Choi .................. H05B 45/3725
2024/0155752 A1* 5/2024 Chu ..................... H05B 45/375

FOREIGN PATENT DOCUMENTS

CN 209949270 U * 1/2020
JP 2004325308 A * 11/2004

* cited by examiner

*Primary Examiner* — Michael Lee

(74) *Attorney, Agent, or Firm* — Schwegman Lundberg & Woessner, P.A.

(57) ABSTRACT

In an example embodiment, an improved lighting controller designed to reduce the effects of electromagnetic interference is introduced. The improved lighting controller contains various features to help ensure noise and signal isolation. First, a control board in the improved lighting controller is designed such that each of a plurality of circuits on the control board contain separate grounds, such that ground planes are isolated from one another rather than sharing a common ground. Additionally, a common mode filter is added to an alternating current input. Additionally, a high frequency filter circuit is also added to a digital input line to further reduce noise.

20 Claims, 6 Drawing Sheets

LIGHTING CONTROLLER WITH NOISE AND SIGNAL ISOLATION

TECHNICAL FIELD

This application relates generally to inspection camera assemblies. More particularly, this application relates to a lighting controller with noise and signal isolation for use in inspection camera assemblies.

BACKGROUND

Inspection cameras are used in industrial products to aid in detecting defects in manufactured products. For example, if a manufacturer is producing metal castings, one or more inspection cameras may be placed in a manufacturing and/or assembly line to inspect the produced metal castings, or portions thereof, to detect any issues with quality control. An inspection camera assembly may include a camera mounted to or near multiple independently controlled light sources. These light sources may be activated in a coordinated sequence that is controlled by a lighting controller, to light the manufactured product from different angles and different times.

DETAILED DESCRIPTION

An issue that can arise in lighting controllers is that noise may be introduced into one or more circuits in a lighting controller. Interrupts and operating systems are often used in such lighting controllers to generate trigger pulses in circuits to control the light sources. While ordinarily the introduced noise does not substantially affect functioning of the lighting controller, specifically in lighting controllers that don't generate interrupts too closely in time to one another, the same is not true for lighting controllers whose interrupts are generated more closely in time to one another. Noise can cause incorrect lighting patterns or sequences, causing difficulty in detecting defects in the manufactured products in images taken during those incorrect lighting patterns or sequences. The noise may be caused by, for example, electromagnetic interference or system grounding issues.

In an example embodiment, an improved lighting controller designed to reduce the effects of electromagnetic interference is introduced. The improved lighting controller contains various features to help ensure noise and signal isolation. First, a control board in the improved lighting controller is designed such that each of a plurality of circuits on the control board contain separate grounds, such that ground planes are isolated from one another rather than sharing a common ground. Additionally, a common mode filter is added to a direct current (DC) input. Additionally, a high frequency filter circuit is also added to a digital input line to further reduce noise.

Figure 1:
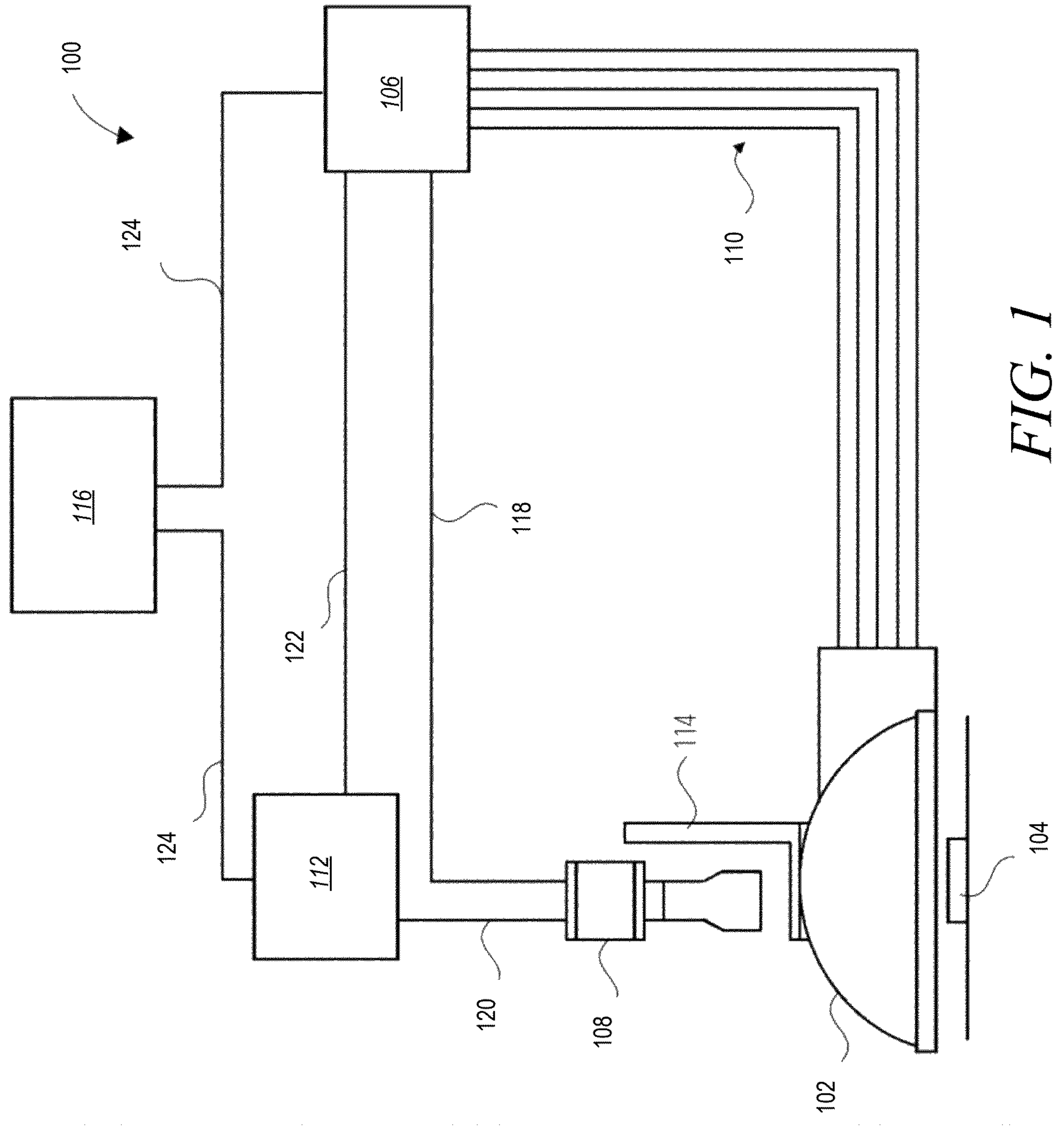
FIG. 1 illustrates a block diagram of an inspection system according to some examples.

FIG. 1 illustrates a block diagram of an inspection system 100 according to some examples. The inspection system 100 includes a light dome 102, a camera 108, a controller 106, an industrial computer 112, and a programmable logic controller (PlC) 116. The PLC 116 is in communication with controller 106 and the computer 112 via a wired or wireless factory network 124.

The light dome 102 in use illuminates a target object 104, such as a metal casting or other product. The light dome 102 includes a housing containing a number of light sources as will be described in more detail below. In some examples, the light sources comprise a plurality of LEDs or display screens arranged to provide flexibility in illuminating the target object 104. The light sources are selectively activated by the controller 106 using power cables 110. A light source is a unit of lighting that is individually addressable by the controller 106 to illuminate the target object 104. An individual light source may thus comprise a single LED or a number of LEDs that are addressable as a group. A light source may also comprise a subset of a light generating unit, such as a group or block of pixels in a flexible display screen. In an example embodiment, the light dome 102 includes more than a few light sources arranged within the light dome 102, to provide lighting flexibility.

The camera 108, which may be mounted to the light dome 102 by a bracket, captures images of the illuminated target object 104 through a hole in the top of the light dome 102. The camera 108 is triggered by the controller 106 via a trigger line 118, synchronized to the actuation of the light sources in light dome 102.

The controller 106 controls operation of the camera 108 and illumination of the target object 104 by the light dome 102. The controller 106 receives instructions from the computer 112 via a control line 122. The controller 106 may further include hardware components that may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein.

The controller 106 illuminates the target object according to one or more optimal lighting configurations. The lighting configurations may be defined as a matrix, where each value of the lighting configuration matrix represents a working status of each independently controllable light source, such as one or more LEDs and/or groups of pixels on a flexible display screen. The matrix may also include brightness or color values for particular configurations. The lighting configurations may also be arranged into a configuration sequence, which specifies an order of lighting configurations to be executed for a particular target object 104, such that a number of images under different lighting conditions are captured by the camera 108.

The computer 112 runs software that provides a user interface that can be used to specify lighting configurations and sequences, which can be loaded into the controller 106. The computer 112 also instructs operation of the controller 106 via the control line 122, and receives images captured by the camera 108 via a data line 120.

The PLC 116 provides overall factory control and can also provide instructions to control or initiate operation of the inspection system 100, based for example on other factory operations such as the movement of target objects 104 past the light dome 102.

Figure 2:
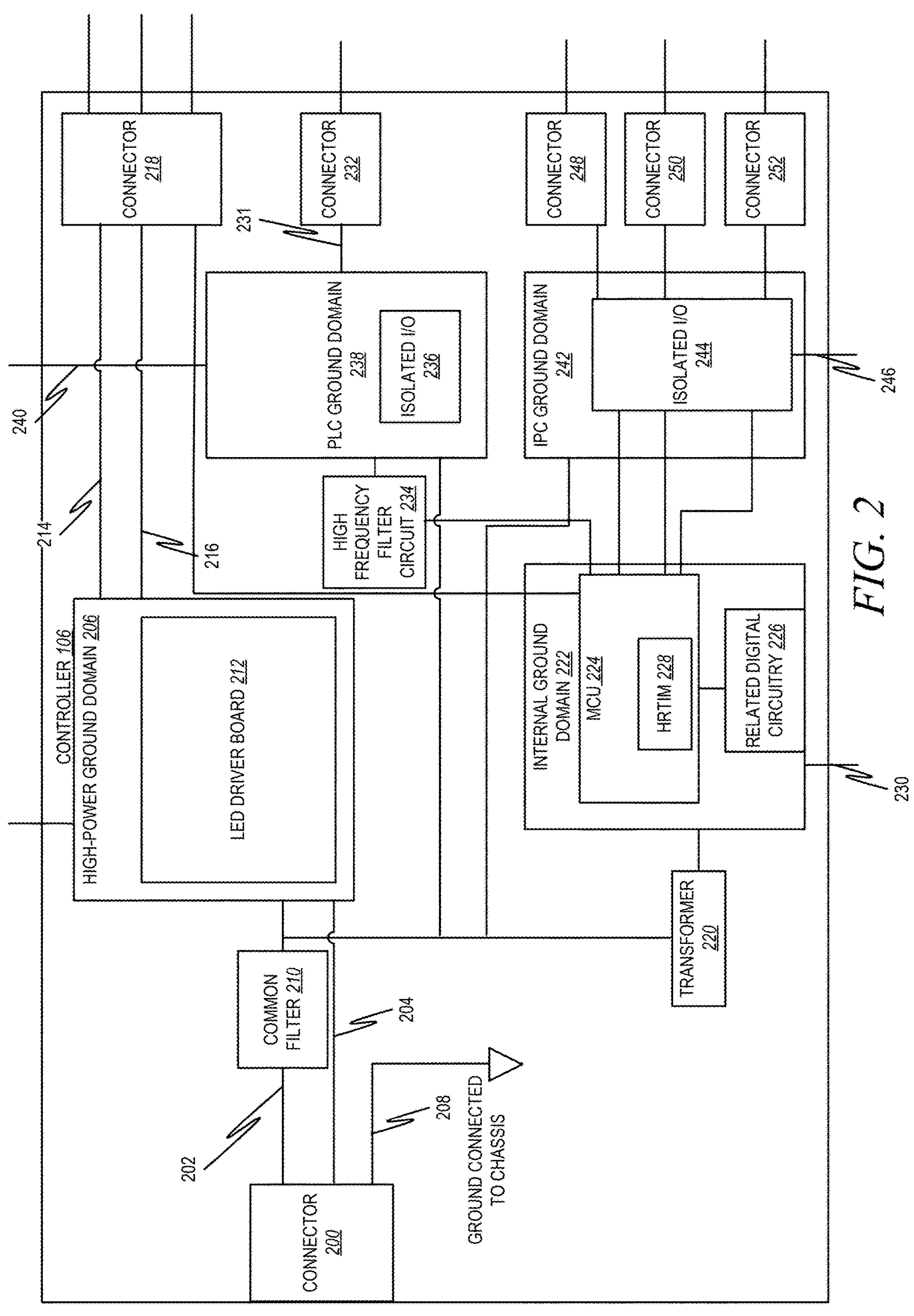
FIG. 2 is a block diagram illustrating the controller of FIG. 1 in more detail, in accordance with an example embodiment.

FIG. 2 is a diagram illustrating the controller 106 of FIG. 1 in more detail, in accordance with an example embodiment. The controller 106 is connected via a connector 200 to output of a DC power supply (not pictured), which in turn is connected to an AC power supply. The connector 200 thus supplies an DC voltage, such as 24V, via a hot line depicted as line 202. An isolated ground line 204 connects a high-power ground domain 206 to the ground provided by the isolated DC power supply, thus electrically isolating the ground of the high-power ground domain 206 from other domains in the controller 106, as will be described more later.

The term "isolated ground" as used herein refers to a ground line that is electrically separated from another ground line.

Additionally, to provide additional electromagnetic interference protection, a chassis of the controller 106 is also connected to a separate isolated ground line 208 connected to a ground provided by the AC power supply (e.g., earth ground).

A common mode filter 210 is connected to both line 202 and isolated ground line 204 The common mode filter 210 acts to filter out any signal that is present in both the hot line and the neutral line. Since such common signals are almost always noise, filtering out them using the common mode filter 210 acts to reduce any noise potentially introduced into the controller 106.

The high-power ground domain 206 contains an LED driver board 212, which acts to drive current on and off to various LEDs via electrical signals on lines 214, 216 to connecter 218.

A transformer 220 transforms the DC power, which may be 24V, to isolated DC power, such as at 5V, which can be used by an internal ground domain 222. The internal ground domain 222 contains a microcontroller unit (MCU) 224 and related digital circuitry 226. The MCU 224 acts to control the sequencing of interrupts used to control the camera and light sources. In an example embodiment, the MCU 224 includes a high-resolution timer (HRTIM) 228. The HRTIM 228 enables the generation of digital signals with precise timing, such as pulse width modulation of phase-shifted pulses. In an example embodiment, the HRTIM 228 may be manufactured around a digital kernel clocked at a maximum frequency of 400 MHz and a 16-bit timer, but this frequency is down-clocked to 12.5 MHz, providing an accuracy of 80 ns/bit. This setup ensures that each count is 80 ns with an accuracy of +/−40 ns and exceptional precision, effectively eliminating any variance in the camera and lighting pulse widths as well as precise (+/−5 ns) synchronization between these two signals. Additional precision is thus also brought to the coherent triggering of lights and camera.

The internal ground domain 222 also has its own isolated ground 230. The MCU 224 receives instructions via an isolated digital input 231 from, for example, the computer 112 of FIG. 1, via connector 232. These instructions are passed through a high frequency filter circuit 234 (at 3.3V). The high frequency filter circuit 234 may be or include a low-pass filter that filters out frequencies above a certain amount. In an example embodiment, the low-pass filter filters out frequencies above 2 kHz.

The instructions to and from the PLC 116 may be processed via an isolated input/output (I/O) 236 in programming logic circuit (PLC) ground domain 238. The PLC ground domain 238 also has its own isolated ground 240.

An industrial personal computer (IPC) ground domain 242 allows for communication between the MCU 224 and cameras and/or an industrial computer. An isolated I/O 244 is provided for that purpose. Additionally, the IPC ground domain 242 also has its own isolated ground 246. Essentially, the ground domains are their own isolated grounds.

Communication with one or more trigger lines may occur via connector 248 and/or connector 250. Communication with the industrial computer may occur via connector 252

Communication with the industrial computer via connector 252 may occur via an Ethernet connection. Ethernet connections provide their own electromagnetic interference mitigation techniques, and thus this further shields the controller 106 from electromagnetic interference.

There are several different options that can be used to supply power to the light dome 102 LED lights as used in the light dome 102 are fired for brief periods of time at high intensity in order to capture successive images of products to be inspected under different lighting conditions (to cast, for example, different shadows on the same product and have light reflect from different angles). The result is that the LED lights need brief periods of high power (when the lights are illuminated) but between these brief periods there are long periods where lower or no power is needed. A 24V power supply as described with respect to FIG. 2 can save on cost over a larger power supply, such as a 36V power supply, both in the initial purchase cost and also in the ongoing energy usage cost. A 24V power supply alone, however, is not enough to power the LED lights in the light dome 102 at their peak usage.

In order to address this technical issue, in an example embodiment a capacitor bank is utilized to augment the power supply to jointly provide necessary power during peak usage while reducing the overall energy usage of the inspection system 100.

Figure 3:
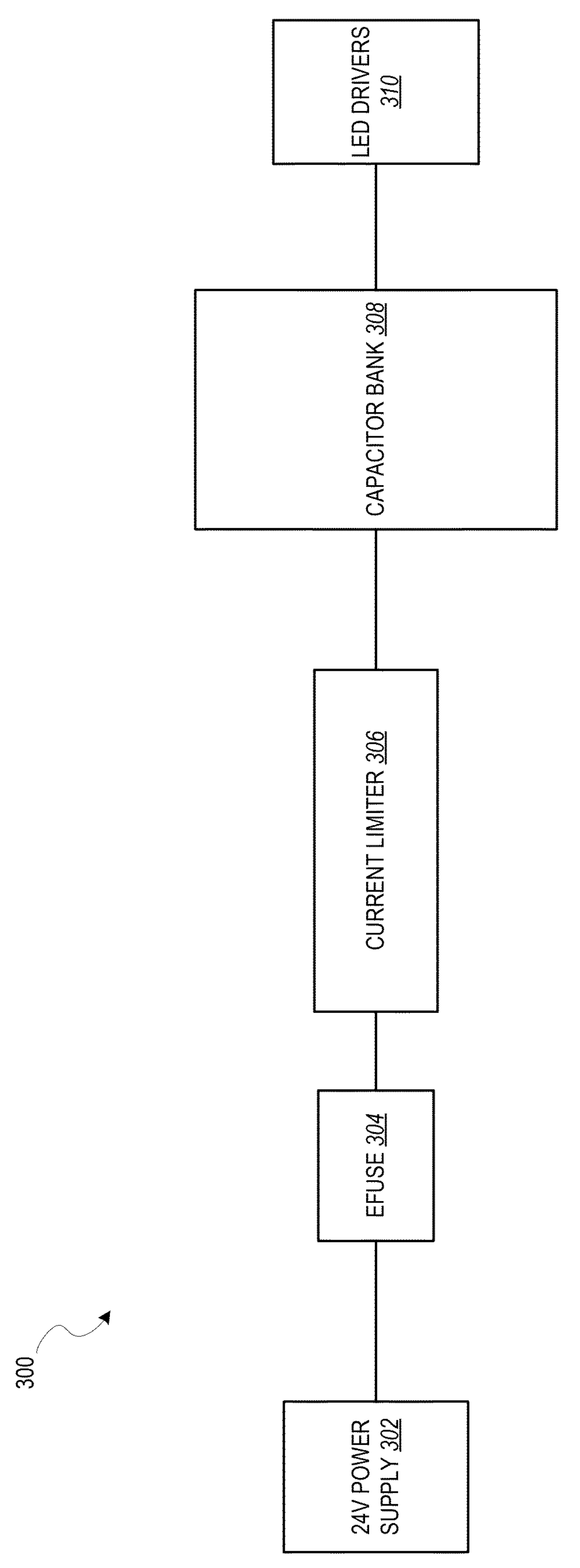
FIG. 3 is a block diagram illustrating a Light Emitting Diode (LED) driver system in accordance with an example embodiment.

FIG. 3 is a block diagram illustrating an LED driver system 300 in accordance with an example embodiment. Here, a 24V input power supply 302 is coupled to an electronic fuse (efuse) 304. The efuse 304 acts to protect circuitry in the power supply system 300 and the rest of the inspection system 100. While not pictured, a physical fuse can also be placed before the efuse 304 to protect the circuit in worst case scenarios. In an example embodiment, the efuse may be designed to cut power at 4.2 A. A current limiter 306 acts to limit current to 2.8 A. A capacitor bank 308 may then store power to be used to augment the 24V power from the 24V input power supply 302 during peak usage of LED drivers 310. In an example embodiment, the capacitor bank 308 may be a 15.5 mF capacitor bank comprising 47 330 uF capacitors.

There are other advantages to this design other than just energy usage and purchase cost savings. The fuse rating of the fuse used can be reduced due to the reduced power of the 24V input power supply 302. Additionally, fuse selection is independent of the load requirement. Furthermore, the 24V input power supply 302 can be placed further away from the controller 106 as the current delivered is less, resulting in less conduction loss and voltage drop.

Referring back to FIG. 2, the HRTIM 228 generates digital waveforms with precise timing. These precision signals are used to trigger the camera, enable the lights and signal external devices. The MCU 224 stores a configuration of light and camera pulses based on information received from the IPC ground domain 242. Once triggered, via PLC, through PLC ground domain 238, the MCU 224 sends information to the HRTIM 228. This information specifies what camera and light pulse widths are required and the synchronization between these two pulses. The HRTIM 228 then configures timers. After the stipulated delay, camera triggers and light activation signals are set to the inactive state. The falling edge of the last trigger pulse generates an interrupt. This interrupt tells the HRTIM 228 to stop the timers and pulses.

The HRTIM 228 is a peripheral block and works independently of the rest of the MCU 224 once it has been programmed. Thus, there is no dependency of the HRTIM 228 on the MCU 224. This helps to make the HRTIM 228 very precise and repeatable. Each HRTIM 228 timer has two outputs. One is used for a camera trigger and the other is used for light activation signals. Since both outputs are driven by the same timer, synchronization between these two signals is guaranteed to be precise (+/−5 ns).

Figure 4:
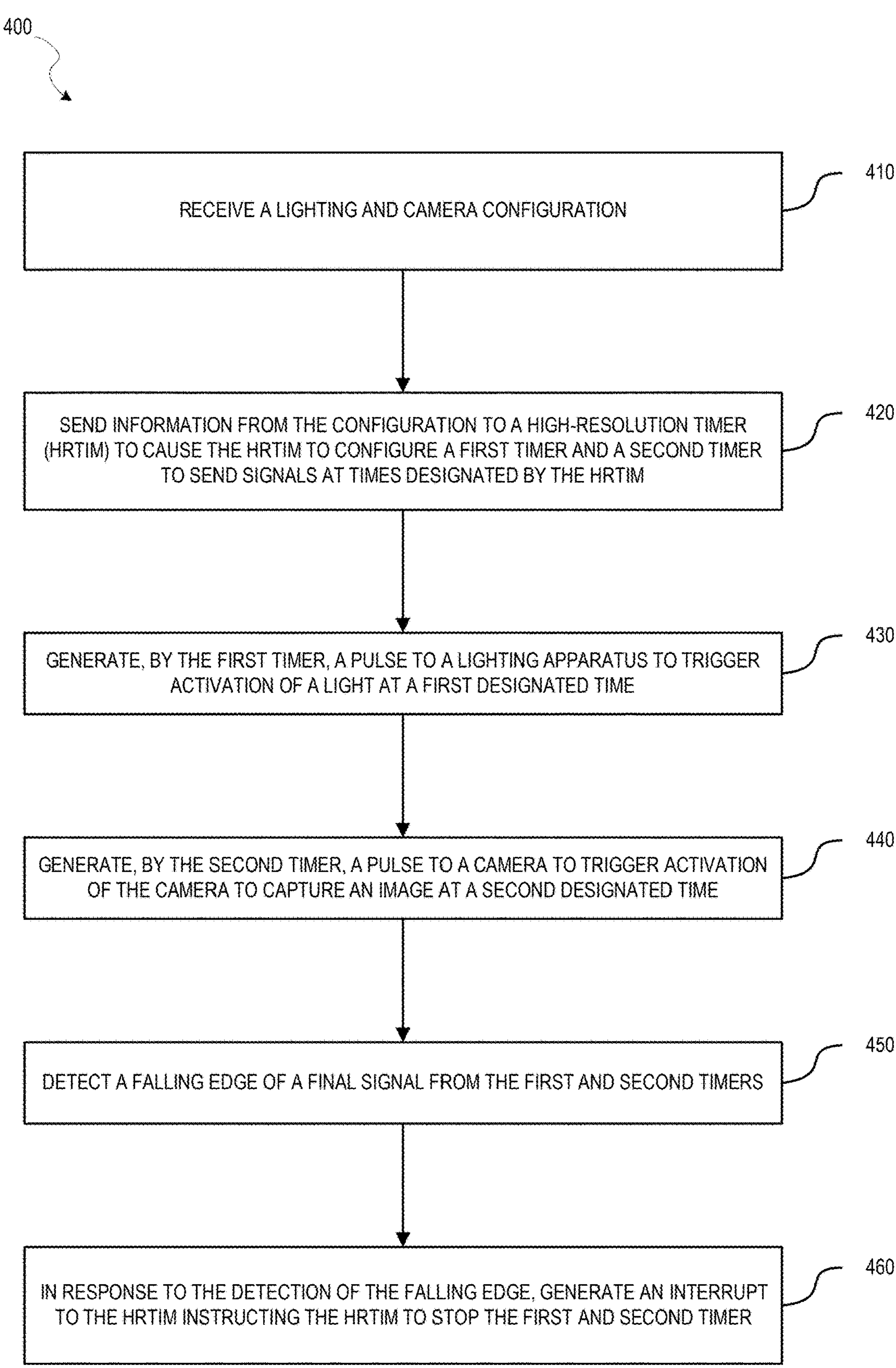
FIG. 4 is a flow diagram illustrating a method for operating a controller, in accordance with an example embodiment.

FIG. 4 is a flow diagram illustrating a method 400 for operating a controller, in accordance with an example embodiment.

At operation 410, a lighting and camera configuration is received. The lighting and camera configuration indicates a sequence of light activation signals and camera triggers. At operation 420, information is sent from the configuration to a high-resolution timer (HRTIM) to cause the HRTIM to configure a first timer and a second timer to send signals at times designated by the HRTIM. At operation 430, the first timer generates a pulse to a lighting apparatus to trigger activation of a light at a first designated time. At operation 440, the second timer generates a pulse to a camera to trigger activation of the camera to capture an image at a second designated time.

At operation 450, the transition from active to inactive of the final signal from the first and second timers is detected. At operation 460, in response to the detection of an active to inactive transition, an interrupt is generated to the HRTIM instructing the HRTIM to stop the first and second timer.

Figure 5:
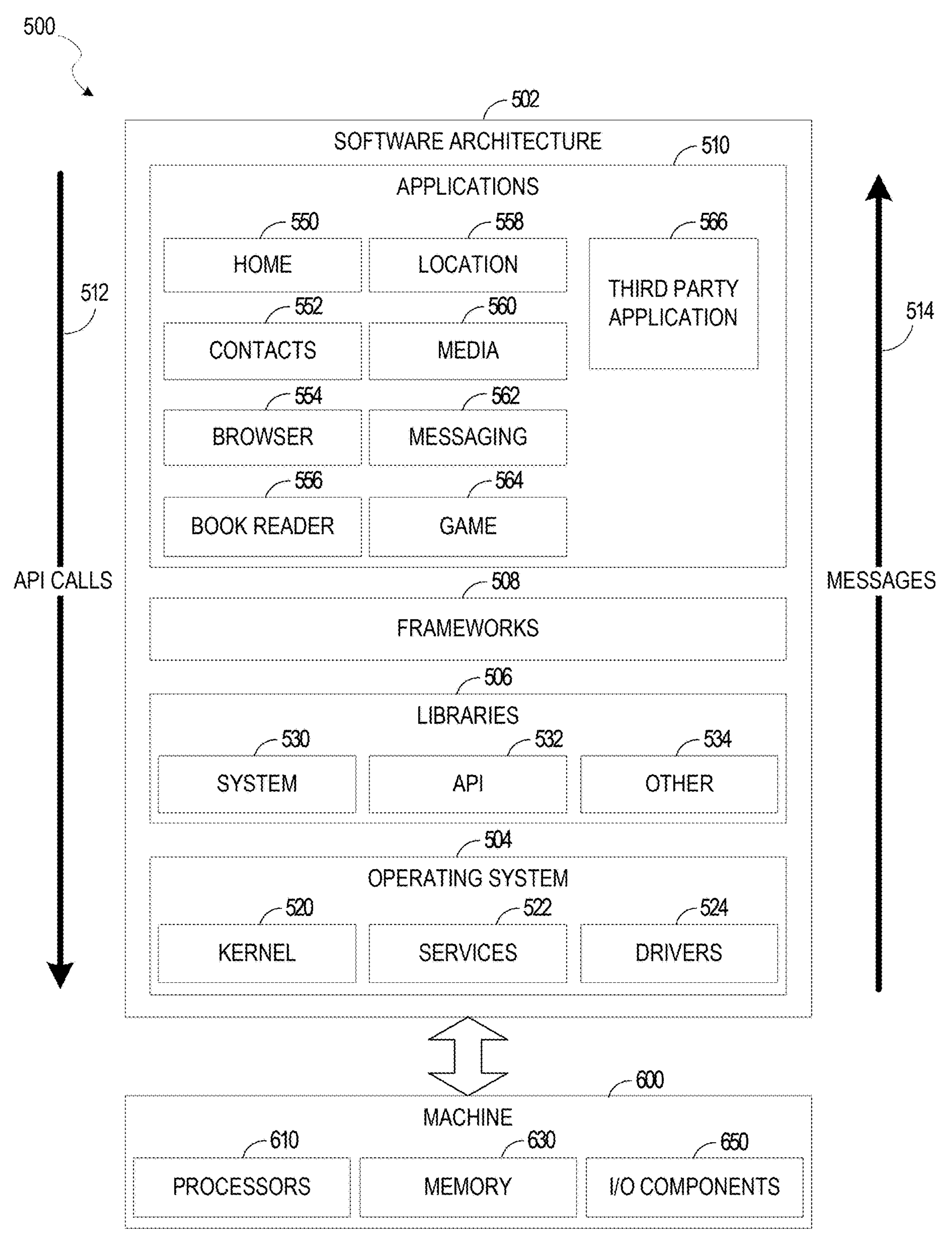
FIG. 5 is a block diagram illustrating a mobile device, according to an example embodiment.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke Application Program Interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionalities. The services 522 can provide other common services for the other software layers. The drivers 524 are responsible for controlling or interfacing with the underlying hardware. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510. For example, the frameworks 508 provide various graphical user interface functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. The applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system.

Figure 6:
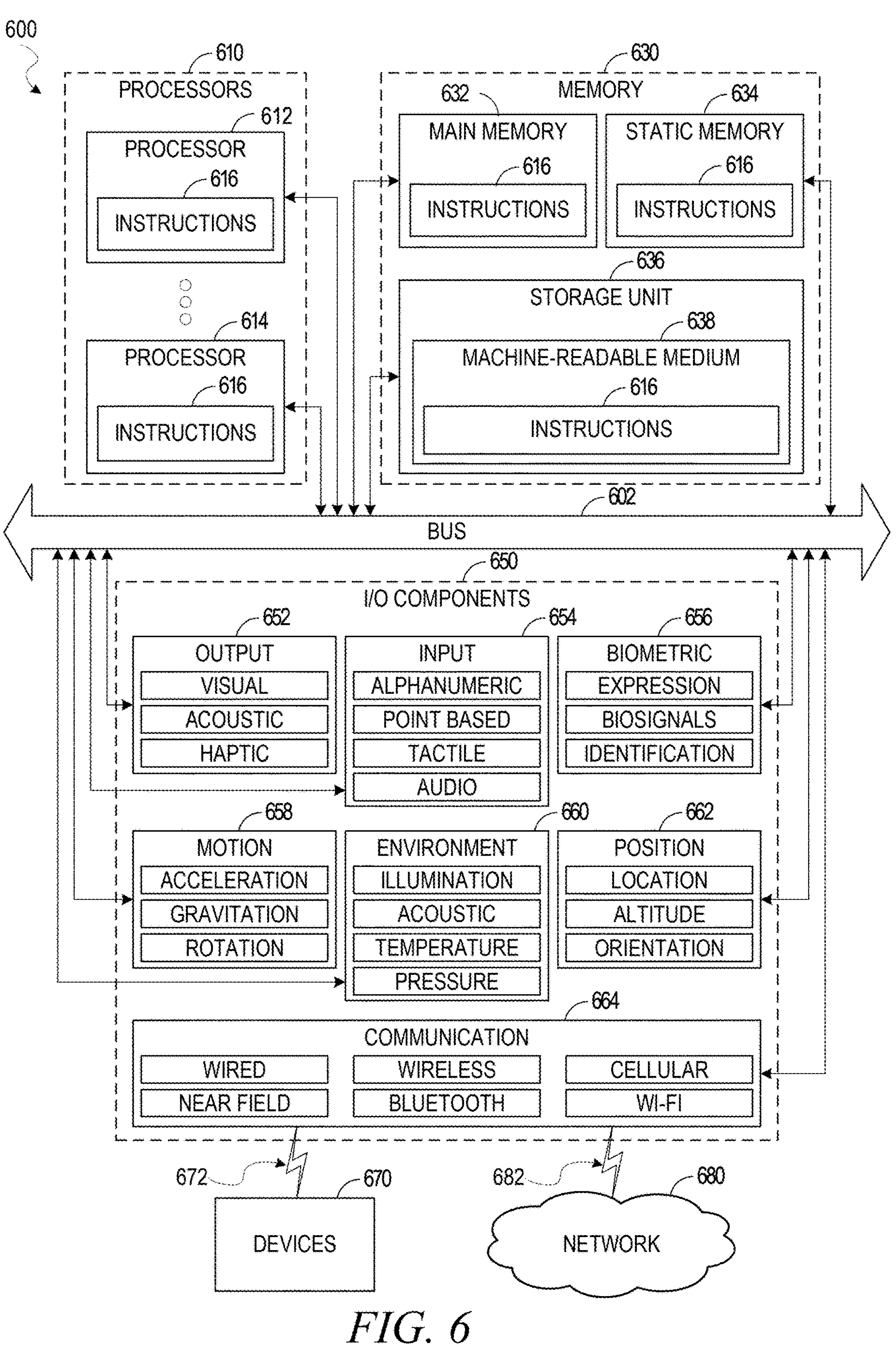
FIG. 6 is a block diagram of machine in the example form of a computer system within which instructions may be executed for causing the machine to perform any one or more of the methodologies discussed herein.

FIG. 6 illustrates a diagrammatic representation of a machine 600 in the form of a computer system within which a set of instructions may be executed for causing the machine 600 to perform any one or more of the methodologies discussed herein. Specifically, FIG. 6 shows a diagrammatic representation of the machine 600 in the example form of a computer system, within which instructions 616

(e.g., software, a program, an application, an applet, an app, or other executable code) cause the machine 600 to perform any one or more of the methodologies discussed herein to be executed. For example, the instructions 616 may cause the machine 600 to execute the method 400 of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 8G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method comprising, at a controller:

receiving a lighting and camera configuration, the lighting and camera configuration indicating a sequence of light activation signals and camera triggers;

sending information from the lighting and camera configuration to a high-resolution timer (HRTIM) to cause the HRTIM to configure a first timer and a second timer to send signals at times designated by the HRTIM;

generating, by the first timer, a first pulse to a lighting apparatus to trigger activation of a light at a first designated time;

generating, by the second timer, a second pulse to a camera to trigger activation of the camera to capture an image at a second designated time;

detecting a transition from active to inactive of a final signal from the first and second timers; and in response to the detection of the transition, generating an interrupt to the HRTIM instructing the HRTIM to stop the first and second timer, wherein the HRTIM is a hardware peripheral of a microcontroller unit (MCU) that, once programmed by the MCU, operates independently of the MCU to generate the first pulse and the second pulse.

2. The method of claim 1, wherein the first and second pulses are pulse width modulation (PWM) pulses.

3. The method of claim 1, wherein the first and second pulses are phase-shifted pulses.

4. The method of claim 1, wherein the controller is affixed to a grounded controller chassis, and wherein the lighting and camera configuration is received from a PLC ground domain having a first isolated ground.

5. The method of claim 1, wherein the lighting apparatus is a light dome containing a plurality of light emitting diodes (LEDs).

6. The method of claim 5, wherein each of the plurality of LEDs has its own independent communications channel.

7. A non-transitory machine-readable storage medium having embodied thereon instructions executable by one or more machines to perform operations on a controller comprising:

receiving a lighting and camera configuration, the lighting and camera configuration indicating a sequence of light activation signals and camera triggers;

sending information from the lighting and camera configuration to a high-resolution timer (HRTIM) to cause the HRTIM to configure a first timer and a second timer to send signals at times designated by the HRTIM;

generating, by the first timer, a first pulse to a lighting apparatus to trigger activation of a light at a first designated time;

generating, by the second timer, a second pulse to a camera to trigger activation of the camera to capture an image at a second designated time;

detecting a transition from active to inactive of a final signal from the first and second timers; and in response to the detection of the transition, generating an interrupt to the HRTIM instructing the HRTIM to stop the first and second timer, wherein the HRTIM is a hardware peripheral of a microcontroller unit (MCU) that, once programmed by the MCU, operates independently of the MCU to generate the first pulse and the second pulse.

8. The non-transitory machine-readable storage medium of claim 7, wherein the first and second pulses are pulse width modulation (PWM) pulses.

9. The non-transitory machine-readable storage medium of claim 7, wherein the first and second pulses are phase-shifted pulses.

10. The non-transitory machine-readable storage medium of claim 7, wherein the controller is affixed to a grounded controller chassis, and wherein the lighting and camera configuration is received from a PLC ground domain having a first isolated ground.

11. The non-transitory machine-readable storage medium of claim 7, wherein the lighting apparatus is a light dome containing a plurality of light emitting diodes (LEDs).

12. A system comprising:

at least one hardware processor; and a non-transitory computer-readable medium storing instructions that, when executed by the at least one hardware processor, cause the system to perform operations at a controller, the operations comprising:

receiving a lighting and camera configuration, the lighting and camera configuration indicating a sequence of light activation signals and camera triggers;

sending information from the lighting and camera configuration to a high-resolution timer (HRTIM) to cause the HRTIM to configure a first timer and a second timer to send signals at times designated by the HRTIM;

generating, by the first timer, a first pulse to a lighting apparatus to trigger activation of a light at a first designated time;

generating, by the second timer, a second pulse to a camera to trigger activation of the camera to capture an image at a second designated time;

detecting a transition from active to inactive of a final signal from the first and second timers; and in response to the detection of the transition, generating an interrupt to the HRTIM instructing the HRTIM to stop the first and second timer, wherein the HRTIM is a hardware peripheral of a microcontroller unit (MCU) that, once programmed by the MCU, operates independently of the MCU to generate the first pulse and the second pulse.

13. The system of claim 12, wherein the first and second pulses are pulse width modulation (PWM) pulses.

14. The system of claim 12, wherein the first and second pulses are phase-shifted pulses.

15. The system of claim 12, wherein the controller is affixed to a grounded controller chassis, and wherein the lighting and camera configuration is received from a PLC ground domain having a first isolated ground.

16. The system of claim 12, wherein the lighting apparatus is a light dome containing a plurality of light emitting diodes (LEDs).

17. The system of claim 16, wherein each of the plurality of LEDs has its own independent communications channel.

18. The system of claim 12, wherein the system further comprises:

a lighting apparatus including one or more independently controllable light source;

a camera;

a power source having a hot line, a neutral line, and a ground line;

a controller coupled to the power source, the camera, and the lighting apparatus, the controller comprising:

a controller chassis coupled to the ground line;

a common mode filter coupled to the hot line and the neutral line;

a high-power ground domain comprising a light driver board, the high-power ground domain coupled to the common mode filter and the lighting apparatus and having a first isolated ground;

a transformer coupled to the common mode filter and to an internal ground domain;

the internal ground domain comprising a microcontroller unit (MCU), the MCU coupled to a high frequency filter circuit, the lighting apparatus, and an industrial personal computer (IPC) ground domain, the internal ground domain having a second isolated ground, the IPC ground domain having a third isolated ground; and the high frequency filter circuit coupled to a programmable logic circuit (PLC) ground domain coupled to the camera, the PLC ground domain having a fourth isolated ground.

19. The system of claim 18, wherein the common mode filter, the high-power ground domain, the transformer, the internal ground domain, the IPC ground domain, the PLC ground domain, and the high frequency filter circuit are all affixed to the controller chassis.

20. The system of claim 18, wherein the IPC ground domain is coupled to a computer via an Ethernet connection.

* * * * *